US010125670B2

(12) United States Patent
Ohisa et al.

(10) Patent No.: US 10,125,670 B2
(45) Date of Patent: *Nov. 13, 2018

(54) TURBOCHARGED ENGINE CONTROL DEVICE

(71) Applicant: MAZDA MOTOR CORPORATION, Hiroshima (JP)

(72) Inventors: Chikako Ohisa, Hiroshima (JP); Osamu Sunahara, Hiroshima (JP); Daisuke Umetsu, Hiroshima (JP); Taizo Ohmae, Higashihiroshima (JP); Yugou Sunagare, Hiroshima (JP); Yasunori Takahara, Hiroshima (JP); Daisaku Ogawa, Hiroshima (JP); Takahiro Kawamura, Hiroshima (JP); Takeatsu Ito, Higashihiroshima (JP)

(73) Assignee: MAZDA MOTOR CORPORATION, Hiroshima (JP)

( * ) Notice: Subject to any disclaimer, the term of this patent is extended or adjusted under 35 U.S.C. 154(b) by 125 days.

This patent is subject to a terminal disclaimer.

(21) Appl. No.: 15/429,319

(22) Filed: Feb. 10, 2017

(65) Prior Publication Data

US 2017/0234210 A1 Aug. 17, 2017

(30) Foreign Application Priority Data

Feb. 15, 2016 (JP) .................. 2016-026115

(51) Int. Cl.
*F02B 37/12* (2006.01)
*F02B 37/16* (2006.01)
*F02D 41/00* (2006.01)

(52) U.S. Cl.
CPC ............ *F02B 37/127* (2013.01); *F02B 37/16* (2013.01); *F02D 41/0007* (2013.01); *F02D 2200/602* (2013.01); *Y02T 10/144* (2013.01)

(58) Field of Classification Search
CPC .... F02B 37/127; F02B 37/16; F02D 41/0007; F02D 2200/602; Y02T 10/144
See application file for complete search history.

(56) References Cited

U.S. PATENT DOCUMENTS 5,276,624 A * 1/1994 Ito .......................... B60K 28/16
180/282
2009/0005931 A1 1/2009 Komatsu
(Continued)

FOREIGN PATENT DOCUMENTS

EP 1193388 A2 4/2002
JP H09-329040 A 12/1997
(Continued)

*Primary Examiner* — Audrey K Bradley
(74) *Attorney, Agent, or Firm* — Studebaker & Brackett PC

(57) ABSTRACT

The turbocharged engine control device comprises a basic target torque-deciding part for deciding a basic target torque based on a driving state of a vehicle including an accelerator pedal operation state; a torque reduction amount-deciding part for deciding a torque reduction amount based on a driving state of the vehicle other than the accelerator pedal operation state; a final target torque-deciding part for deciding a final target torque based on the decided basic target torque and the decided torque reduction amount; and an engine output control part for controlling the engine so as to cause the engine to output the decided final target torque, wherein the engine output control part is operable, when an operating state of the engine falls within a supercharging region where supercharging by a compressor, to restrict control of the engine corresponding to a change in the torque reduction amount.

9 Claims, 9 Drawing Sheets

(56) References Cited

U.S. PATENT DOCUMENTS

| | | | |
|---|---|---|---|
| 2011/0066338 A1* | 3/2011 | Andrasko | F02D 41/021 |
| | | | 701/54 |
| 2012/0209489 A1 | 8/2012 | Saito et al. | |
| 2017/0021824 A1* | 1/2017 | Johri | B60W 20/19 |

FOREIGN PATENT DOCUMENTS

| | | |
|---|---|---|
| JP | 2002-106398 A | 4/2002 |
| JP | 2007-247606 A | 9/2007 |
| JP | 2009-006873 A | 1/2009 |
| JP | 2011-088576 A | 5/2011 |
| JP | 2014-166014 A | 9/2014 |

* cited by examiner

TURBOCHARGED ENGINE CONTROL DEVICE

TECHNICAL FIELD

The present invention relates to a turbocharged engine control device, and more particularly to a turbocharged engine control device for controlling an engine equipped with a turbocharger having a compressor provided in an intake passage, based on a driving state of a vehicle mounting the engine.

BACKGROUND ART

Heretofore, there has been known a control device capable of, in a situation where a behavior of a vehicle becomes unstable due to road wheel slip or the like, controlling the vehicle behavior to enable a safe traveling (e.g., an antiskid brake device). Specifically, there has been known a control device operable to detect the occurrence of vehicle understeer or oversteer behavior during vehicle cornering or the like, and apply an appropriate degree of deceleration to one or more road wheels so as to suppress such a behavior.

There has also been known a vehicle motion control device operable to adjust a degree of deceleration during vehicle cornering to thereby adjust load to be applied to front road wheels so as to allow a series of driver's operations (braking, turning of a steering wheel, accelerating, turning-back of the steering wheel, etc.) during vehicle cornering under a normal traveling condition to be realized naturally and stably, differently from the aforementioned control for improving safety in a traveling condition causing the vehicle behavior to become unstable (see, for example, the following Patent Document 1).

Further, there has been proposed a vehicle behavior control device operable to reduce a driving force for a vehicle according to yaw rate-related quantity corresponding to a steering wheel operation by a driver (e.g., yaw acceleration), thereby making it possible to quickly generate vehicle deceleration in response to start of the steering wheel operation by the driver and thus quickly apply a sufficient load to front road wheels as steerable road wheels (see, for example, the following Patent Document 2). In this vehicle behavior control device, in response to start of the steering wheel operation, load is quickly applied to the front road wheels to cause an increase in frictional force between each of the front road wheels and a road surface and thus an increase in cornering force of the front road wheels, thereby providing an improved turn-in ability of the vehicle in an initial phase after entering a curve, and an improved responsivity with respect to a turning operation of a steering wheel. This makes it possible to realize a vehicle behavior as intended by the driver.

CITATION LIST

Patent Document

Patent Document 1: JP 2011-088576A
Patent Document 2: JP 2014-166014A

SUMMARY OF INVENTION

Technical Problem

Meanwhile, in the field of internal combustion engines such as a gasoline engine and a diesel engine, there has been known a technique of providing a turbocharger with a view to improving engine power output, and controlling supercharging pressure of the turbocharger according to a target torque decided based on a driving state of a vehicle mounting the engine (e.g., various operation states of an accelerator pedal, a brake pedal, a steering wheel and others by a driver, and traveling environments such as vehicle speed, ambient temperature, atmospheric pressure, road grade and road surface mu ($\mu$)).

Assume that, in such a control device for an engine equipped with a turbocharger (turbocharged engine control device), a current target torque is instantaneously changed by the vehicle behavior control device described in the Patent Document 2, so as to generate vehicle deceleration according to a steering wheel operation by a driver. In this case, the turbocharger is controlled to realize the changed target torque. That is, the engine control device operates to control the turbocharger so as to change supercharging pressure according to a change in target torque.

However, when a current target torque is instantaneously reduced so as to generate vehicle deceleration, the turbocharger is controlled so as to lower supercharging pressure according to the reduction in target torque. Thus, after that, when the reduced target torque is instantaneously increased, a rise in supercharging pressure cannot catch up with the increase in target torque, causing deterioration in acceleration response.

In the field of turbochargers, it is also known that, when an opening degree of a throttle valve disposed downstream of a compressor of a turbocharger is reduced to narrow an intake passage to thereby reduce an intake air amount, an air backflow phenomenon in the compressor, so-called "surging", occurs. Therefore, in order to suppress the occurrence of the surging, it is common practice to provide a bypass passage bypassing the compressor, and an air bypass valve capable of opening and closing the bypass passage, and control the air bypass valve such that it is opened when the opening degree of the throttle valve is reduced, to release supercharging pressure toward a region of the intake passage upstream of the compressor via the bypass passage.

In the case where a current target torque is instantaneously reduced by the vehicle behavior control device described in the Patent Document 2, so as to generate vehicle deceleration according to a steering wheel operation by a driver, the air bypass valve may be opened in the above manner to avoid the occurrence of the surging. In this case, however, when the air bypass valve is opened, supercharging pressure is lowered. Thus, after that, when an acceleration demand is generated, acceleration response is deteriorated.

The present invention has been made to solve the above conventional problems, and an object thereof is to provide a turbocharged engine control device capable of controlling a turbocharged engine so as to accurately realize a vehicle behavior as intended by a driver, while suppressing deterioration in acceleration response.

Solution to Technical Problem

In order to achieve the above object, the present invention provides a turbocharged engine control device for controlling an engine equipped with a turbocharger having a compressor provided in an intake passage, based on a driving state of a vehicle mounting the engine. The turbocharged engine control device comprises: a basic target torque-deciding part for deciding a basic target torque based on a driving state of the vehicle including an accelerator pedal operation state; a torque reduction amount-deciding part for deciding a torque reduction amount based on a driving state of the vehicle other than the accelerator pedal operation state; a final target torque-deciding part for deciding a final target torque based on the decided basic target torque and the decided torque reduction amount; and an engine output control part for controlling the engine to cause the engine to output the final target torque, wherein the engine output control part is operable, when an operating state of the engine falls within a supercharging region where supercharging by the compressor is performed, to restrict control of the engine corresponding to a change in the torque reduction amount.

In the turbocharged engine control device of the present invention having the above feature, when the operating state of the engine falls within the supercharging region where supercharging by the compressor is performed, the engine output control part operates to restrict the control of the engine corresponding to a change in a torque reduction amount which is decided based on a driving state of the vehicle other than the accelerator pedal operation state, so that it is possible to suppress the occurrence of a situation where a supercharging pressure is excessively lowered as a result of controlling the engine according to a change in the torque reduction amount without any restriction. This makes it possible to control the engine so as to accurately realize a vehicle behavior as intended by a driver, while suppressing deterioration in acceleration response.

Preferably, in the turbocharged engine control device of the present invention, the engine output control part is operable, when the operating state of the engine falls within the supercharging region where supercharging by the compressor is performed, to prohibit the control of the engine corresponding to a change in the torque reduction amount.

In the turbocharged engine control device having the above feature, when the operating state of the engine falls within the supercharging region, the engine output control part can reliably prevent the occurrence of a situation where the supercharging pressure is excessively lowered as a result of controlling the engine according to a change in the torque reduction amount without any restriction. This makes it possible to control the engine so as to accurately realize a vehicle behavior as intended by a driver, while reliably suppressing deterioration in acceleration response.

Preferably, in the turbocharged engine control device of the present invention, wherein the engine output control part comprises an air amount control part for controlling an intake air amount to cause the engine to output the final target torque, wherein the air amount control part is operable, when the operating state of the engine falls within the supercharging region where supercharging by the compressor is performed, to restrict control of the intake air amount according to a change in the final target torque corresponding to a change in the torque reduction amount.

In the turbocharged engine control device having the above feature, when the operating state of the engine falls within the supercharging region, the air amount control part can reliably prevent the occurrence of surging which would otherwise be caused by a situation where the flow rate of air passing through the compressor is excessively reduced as a result of reducing the intake air amount according to a change in the torque reduction amount without any restriction. This makes it possible to suppress a lowering of the supercharging pressure which would otherwise be caused by opening the aforementioned air bypass valve so as to avoid surging, and thereby suppressing deterioration in acceleration response.

Preferably, in the above turbocharged engine control device, the air amount control part is operable, when the operating state of the engine falls within the supercharging region where supercharging by the compressor is performed, to restrict the control of the intake air amount according to a change in the final target torque corresponding to a change in the torque reduction amount, so as to enable a flow rate of intake air passing through the compressor to become equal to or greater than a given flow rate.

In the turbocharged engine control device having the above feature, when the operating state of the engine falls within the supercharging region, the air amount control part can reliably prevent the occurrence of surging which would otherwise be caused by a situation where the flow rate of air passing through the compressor is excessively reduced as a result of reducing the intake air amount according to a change in the final target torque corresponding to a change in the torque reduction amount without any restriction. This makes it possible to reliably prevent a lowering of the supercharging pressure which would otherwise be caused by opening the aforementioned air bypass valve so as to avoid surging, and thereby preventing deterioration in acceleration response.

Preferably, in the turbocharged engine control device of the present invention, the torque reduction amount-deciding part is operable to decide the torque reduction amount according to operation of a steering wheel of the vehicle.

In the turbocharged engine control device having the above feature, a temporal change in an torque reduction amount decided based on the steering wheel operation can be reflected on a temporal change in the final target torque, so that it possible to quickly add deceleration according to the steering wheel operation by a driver to a vehicle to thereby apply load to front road wheels to quickly increase a cornering force. This makes it possible to control the engine so as to accurately realize a vehicle behavior as intended by the driver, while improving responsivity with respect to the steering wheel operation.

Effect of Invention

The turbocharged engine control device of the present invention can control a turbocharged engine so as to accurately realize a vehicle behavior as intended by a driver, while suppressing deterioration in acceleration response.

DESCRIPTION OF EMBODIMENTS

With reference to the accompanying drawings, a turbocharged engine control device of the present invention will now be described based on some embodiments thereof.

Figure 1:
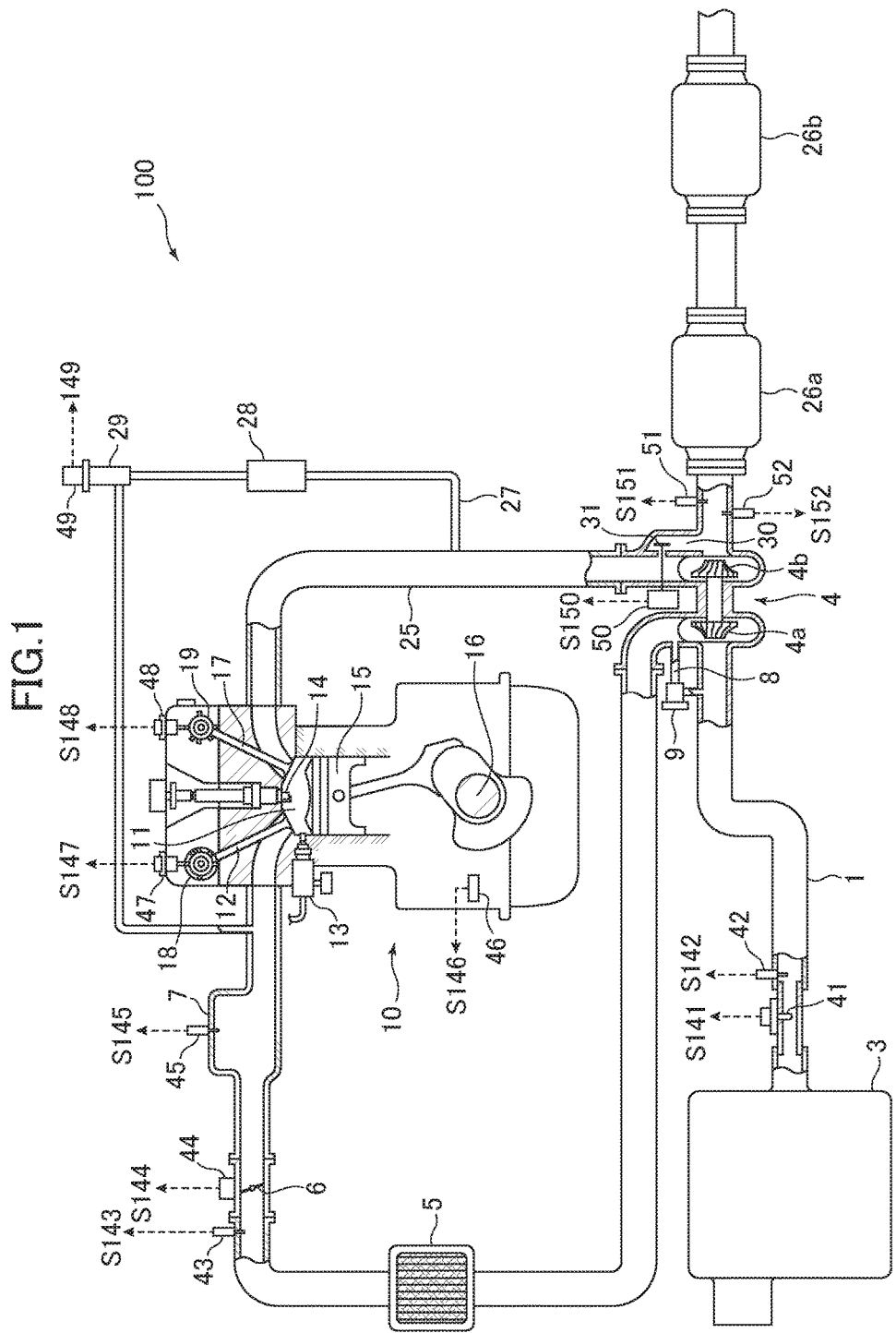
FIG. 1 is a schematic diagram depicting a configuration of an engine employing a turbocharged engine control device according to one embodiment of the present invention.

First of all, an engine employing a turbocharged engine control device according to one embodiment of the present invention will be described with reference to FIGS. 1 and 2. FIG. 1 is a schematic diagram depicting a configuration of the engine employing the turbocharged engine control device according to this embodiment, and FIG. 2 is a block diagram depicting an electrical configuration of the turbocharged engine control device according to this embodiment.

Figure 2:
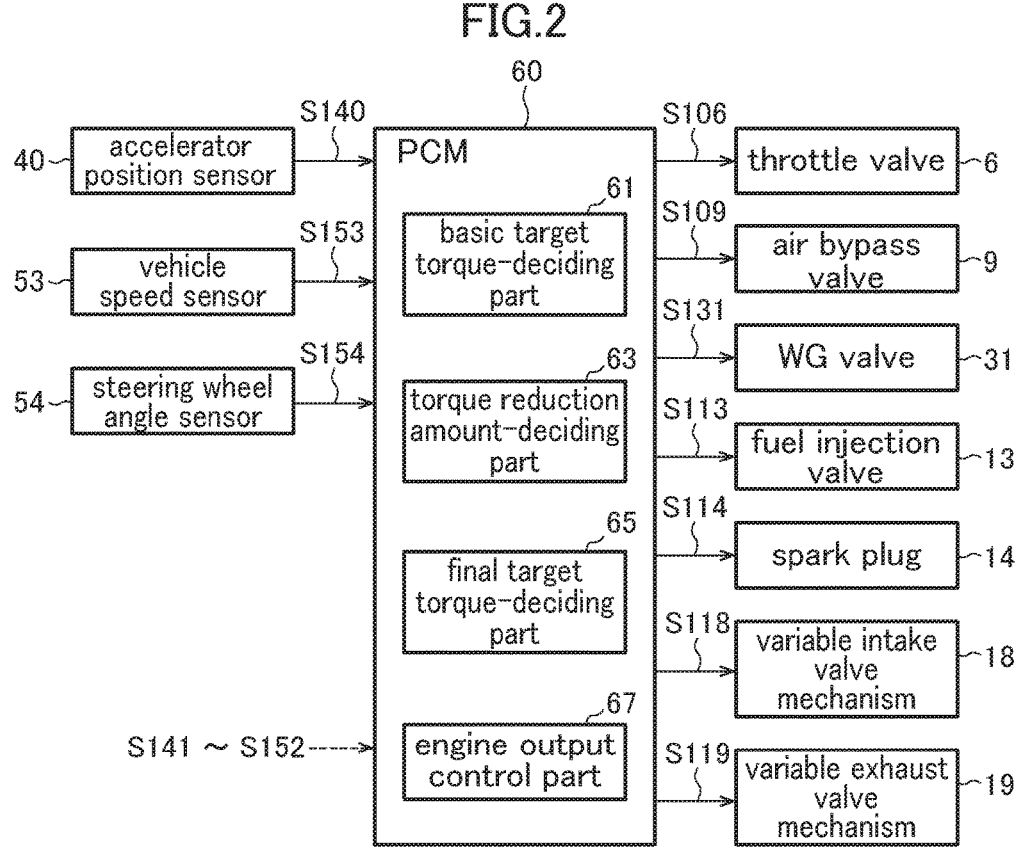
FIG. 2 is a block diagram depicting an electrical configuration of the turbocharged engine control device according to this embodiment.

As depicted in FIGS. 1 and 2, the engine 100 primarily comprises: an intake passage 1 for allowing intake air (air) introduced from outside to pass therethrough; an engine body 10 (specifically, gasoline engine) for generating a vehicle driving force through combustion of a mixture of intake air supplied from the intake passage 1 and fuel supplied from an aftermentioned fuel injection valve 13; an exhaust passage 25 for discharging exhaust gas produced by the combustion within the engine body 10; and a powertrain control module (PCM) 60 (turbocharged engine control device) for controlling an entirety of the engine 100.

The intake passage 1 is provided with an air cleaner 3 for cleaning intake air introduced from outside, a compressor 4a of a turbocharger 4, an intercooler 5 for cooling intake air by external air or cooling water, a throttle valve 6 for adjusting an amount of intake air passing therethrough (intake air amount), and a surge tank 7 for temporarily reserving intake air to be supplied to the engine body 10, which are arranged in this order from the side of an upstream end of the intake passage 1.

The intake passage 1 is also provided with an air bypass passage 8 for recirculating a part of intake air supercharged by the compressor 4a, to a region of the intake passage 1 upstream of the compressor 4a. Specifically, one end of the air bypass passage 8 is connected to the intake passage 1 at a position downstream of the compressor 4a and upstream of the throttle valve 6, and the other end of the air bypass passage 8 is connected to the intake passage 1 at a position downstream of the air cleaner 3 and upstream of the compressor 4a.

The air bypass passage 8 is provided with an air bypass valve 9 for adjusting a flow rate of intake air flowing through the air bypass passage 8. The air bypass valve 9 is a so-called on-off valve capable of being switched between a closed position where it completely blocks the air bypass passage 8, and an open position where it completely unblocks the air bypass passage 8.

The engine body 10 primarily comprises: an intake valve 12 for selectively introducing intake air from the intake passage 1 into a combustion chamber 11; a fuel injection valve 13 for injecting fuel toward the combustion chamber 11; a spark plug 14 for igniting a mixture of the intake air and the fuel supplied into the combustion chamber 11; a piston 15 configured to be reciprocatingly moved according to combustion of the air-fuel mixture within the combustion chamber 11; a crankshaft 16 configured to be rotated according to the reciprocating movement of the piston 15; and an exhaust valve 17 for selectively discharging exhaust gas produced by the combustion of the air-fuel mixture within the combustion chamber 11, to the exhaust passage 25.

The engine body 10 is configured such that operation timings (which are equivalent to valve phases) of the intake valve 12 and the exhaust valve 17 are variably controlled, respectively, by an intake variable valve timing mechanism 18 and an exhaust variable valve timing mechanism 19 which serve as a variable valve timing mechanism. As each of the intake variable valve timing mechanism 18 and the exhaust variable valve timing mechanism 19, one of various heretofore-known types may be applied. For example, a variable valve timing mechanism of an electromagnetic type or a hydraulic type may be employed to variably control the operation timings of the intake valve 12 and the exhaust valve 17.

The exhaust passage 25 is provided with a turbine 4b of the turbocharger 4 configured to be rotated by exhaust gas passing therethrough to thereby drive the compressor 4a, and a plurality of exhaust gas purifying catalysts 26a, 26b having exhaust gas purifying functions, such as a NOx catalyst, a three-way catalyst and an oxidation catalyst, which are arranged in this order from the side of an upstream end of the exhaust passage 25. In the following description, when the exhaust gas purifying catalysts 26a, 26b are generically used without being functionally distinguished from each other, they will be described as "exhaust gas purifying catalyst 26".

The exhaust passage 25 is connected with an exhaust gas recirculation (hereinafter abbreviated as "EGR") passage 27 for recirculating a part of exhaust gas to the intake passage 1. One end of the EGR passage 27 is connected to the exhaust passage 25 at a position upstream of the turbine 4b, and the other end of the EGR passage 27 is connected to the intake passage at a position downstream of the throttle valve 11. The EGR passage 27 is provided with an EGR cooler 28 for cooling exhaust gas being recirculated, and an EGR valve 29 for controlling a flow rate of exhaust gas flowing through the EGR passage 27.

The exhaust passage 25 is also provided with a turbine bypass passage 30 for causing exhaust gas to bypass the turbine 4b of the turbocharger 4. The turbine bypass passage 30 is provided with a wastegate valve (hereinafter abbreviated as "WG value") 31 for controlling a flow rate of exhaust gas flowing through the turbine bypass passage 30.

The engine 100 further comprises a plurality of sensors 40 to 54 for detecting various states concerning control of the engine 100. Specifically, these sensors 40 to 54 are as follows. The sensor 40 is an accelerator position sensor for detecting an accelerator position, i.e., an angular position of a non-depicted accelerator pedal (which is equivalent to an amount of depression of the accelerator pedal manipulated by a driver). The sensor 41 is an airflow sensor for detecting an intake air amount which is equivalent to a flow rate of intake air passing through a region of the intake passage 1 between the air cleaner 3 and the compressor 4a. The sensor 42 is a first temperature sensor for detecting a temperature of intake air passing through the region of the intake passage 1 between the air cleaner 3 and the compressor 4a. The sensor 43 is a first pressure sensor for detecting a supercharging pressure. The sensor 44 is a throttle opening sensor for detecting a throttle opening which is an opening degree of the throttle valve 6. The sensor 45 is a second pressure sensor for detecting an intake manifold pressure (internal pressure of the surge tank 7) which is equivalent to a pressure of intake air supplied to the engine body 10. The sensor 46 is a crank angle sensor for detecting a crank angle of the crankshaft 16. The sensor 47 is an intake-side cam angle sensor for detecting a cam angle of an intake camshaft. The sensor 48 is an exhaust-side cam angle sensor for detecting a cam angle of an exhaust camshaft. The sensor 49 is an EGR opening sensor for detecting an opening degree of the EGR valve 29. The sensor 50 is a WG opening sensor for detecting an opening degree of the WG valve 31. The sensor 51 is an $O_2$ sensor for detecting an oxygen concentration of exhaust gas. The sensor 52 is an exhaust gas temperature sensor for detecting an exhaust gas temperature. The sensor 53 is a vehicle speed sensor for detecting a speed of a vehicle mounting the engine 100 (vehicle speed). The sensor 54 is a steering wheel angle sensor for detecting a rotational angle (steering wheel angle) of a steering wheel (not depicted). The above sensors 40 to 54 are operable to output, to the PCM 60, detection signals S140 to S154 corresponding to detected parameters, respectively.

Based on the detection signals S140 to S154 input from the sensors 40 to 54, the PCM 60 is operable to perform controls for various components of the engine 100. Specifically, as depicted in FIG. 2, the PCM 60 is operable to: supply a control signal S106 to the throttle valve 6 to control of opening and closing timings and the throttle opening of the throttle valve 6; supply a control signal S109 to the air bypass valve 9 to control opening and closing of the air bypass valve 9; supply a control signal S131 to the WG valve to control the opening degree of the WG valve 31; supply a control signal S113 to the fuel injection valve 13 to control a fuel injection amount and a fuel injection timing; supply a control signal S114 to the spark plug 14 to control an ignition timing; supply control signals S118, S119, respectively, to the intake variable valve timing mechanism 18 and the exhaust variable valve timing mechanism 19 to control the operation timings of the intake valve 12 and the exhaust valve 17.

The PCM 60 comprises: a basic target torque-deciding part 61 for deciding a basic target torque based on a driving state of the vehicle including an accelerator pedal operation state; a torque reduction amount-deciding part 63 for deciding a torque reduction amount based on a driving state of the vehicle other than the accelerator pedal operation state; a final target torque-deciding part 65 for deciding a final target torque based on the decided basic target torque and the decided torque reduction amount; and an engine output control part 67 for controlling the engine 100 to cause the engine 100 to output the decided final target torque (the engine output control part 67 is equivalent to "engine control part" or "air amount control part" set forth in the appended claims).

The above parts of the PCM 60 are functionally realized by a computer which comprises: a CPU; various programs (including a basic control program such as an OS, and an application program capable of being activated on the OS to realize a specific function) to be interpreted and executed by the CPU; and an internal memory such as ROM or RAM storing therein the programs and a variety of data.

Figure 3:
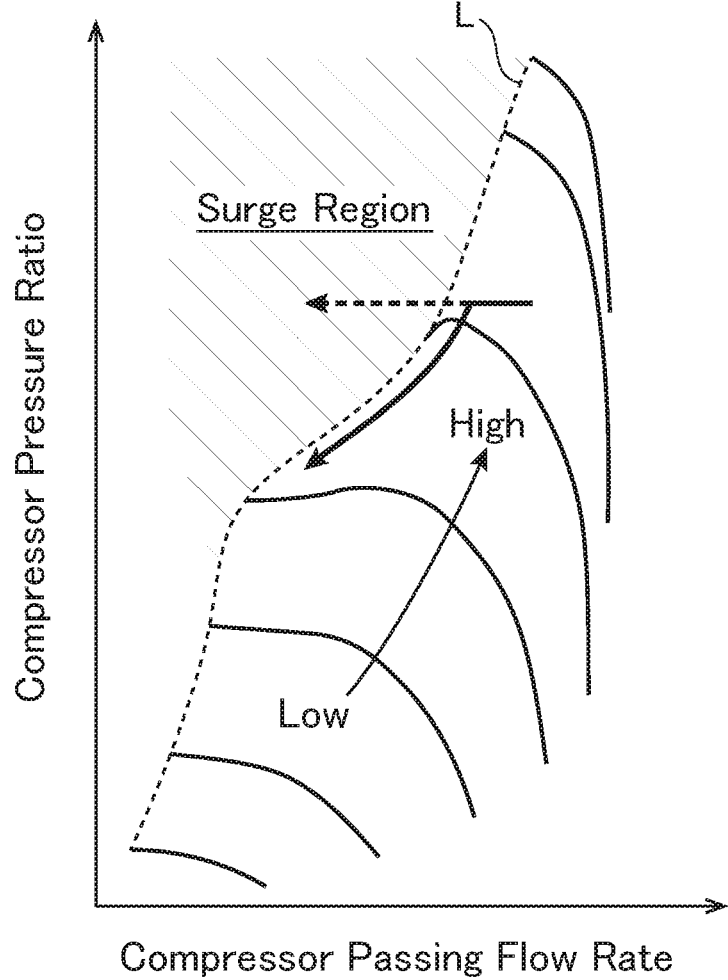
FIG. 3 is a turbocharger compressor performance map usable in this embodiment.

Next, with reference to FIG. 3, an open-close control for the air bypass valve 9 will be described. FIG. 3 is a turbocharger compressor performance map usable in this embodiment.

The turbocharger 4 has performance represented as the compressor performance map in FIG. 3. The compressor performance map defines a relationship of: compressor passing flow rate which is a flow rate of intake air passing through the compressor 4a; compressor pressure ratio (supercharging pressure/atmospheric pressure) which is a ratio of an intake pressure at a position downstream of the compressor 4a to an intake pressure at a position upstream of the compressor 4a; and compressor speed which is a rotational speed of the compressor 4a. This compressor performance map is stored in the internal memory of the PCM 60.

In the compressor performance map, a so-called surge region is defined in a region on the left side toward which the compressor passing flow rate becomes smaller, with respect to the broken line (hereinafter referred to as "surge line") L depicted in FIG. 3. The surge region is defined by a relationship between the compressor passing flow rate and the compressor pressure ratio. Specifically, as the compressor pressure ratio becomes higher, the surge region is gradually expanded in a direction causing the compressor passing flow rate to become lager. The surge region means an operating range in which the compressor pressure ratio is excessively high with respect to the compressor passing flow rate, and therefore intake air supercharged by the compressor 4a can flow back toward the compressor 4a, i.e., surging can occur.

For example, a situation where an operating state of the compressor 4a is apt to enter the surge region occurs during a speed change operation of an automatic transmission. Specifically, in the case where the opening degree of the throttle valve 6 is adjusted to reduce an output torque of the engine 100 in response to a torque-down demand from an automatic transmission control unit (ATCU), the opening degree of the throttle valve 6 is reduced to narrow the intake passage, and, on the other hand, the compressor 4a is continued to rotate for a while by an inertial force, so that supercharging is continued for a while. This causes a situation where the amount of intake air to be supplied to the engine body 10, i.e., the compressor passing flow rate, is restricted, while the compressor pressure ratio is maintained at a relatively high valve, possibly leading to surging.

The engine output control part 67 is operable, based on the compressor performance map, to determine whether or not surging occurs in the compressor 4*a*, and, according to a result of the determination, to perform the open-close control for the air bypass valve 9.

Specifically, the engine output control part 67 operates to estimate the compressor passing flow rate, based on an intake air amount detected by the airflow sensor 41. Then, the engine output control part 67 operates to calculate the compressor pressure ratio, based on an atmospheric pressure detected by an atmospheric pressure sensor (not depicted) and a supercharging pressure detected by the first pressure sensor 43. Subsequently, the engine output control part 67 operates to refer to the compressor performance map depicted in FIG. 3, and, based on the compressor passing flow rate and the compressor pressure ratio, determine whether or not a current operating state of the compressor 4*a* falls within the surge region, i.e., whether or not surging can occur. Specifically, it is determined whether an estimated value of the compressor passing flow rate is equal to less than a value of the compressor passing flow rate on the surge line L corresponding to a calculated value of the compressor pressure ratio.

As a result, when it is determined that surging can occur, the engine output control part 67 operates to set the air bypass valve 9 to the open position to release the supercharging pressure to the region of the intake passage 1 upstream of the compressor 4*a*, thereby avoiding the occurrence of surging. On the other hand, when it is determined that no surging can occur, the engine output control part 67 operates to set the air bypass valve 9 to the closed position to maintain a current supercharging pressure. This open-close control for the air bypass valve 9 is continuously and repeatedly executed during the operation of the engine 100.

Next, with reference to FIGS. 4 to 6, a first example of engine control processing routine to be executed by the turbocharged engine control device will be described.

Figure 4:
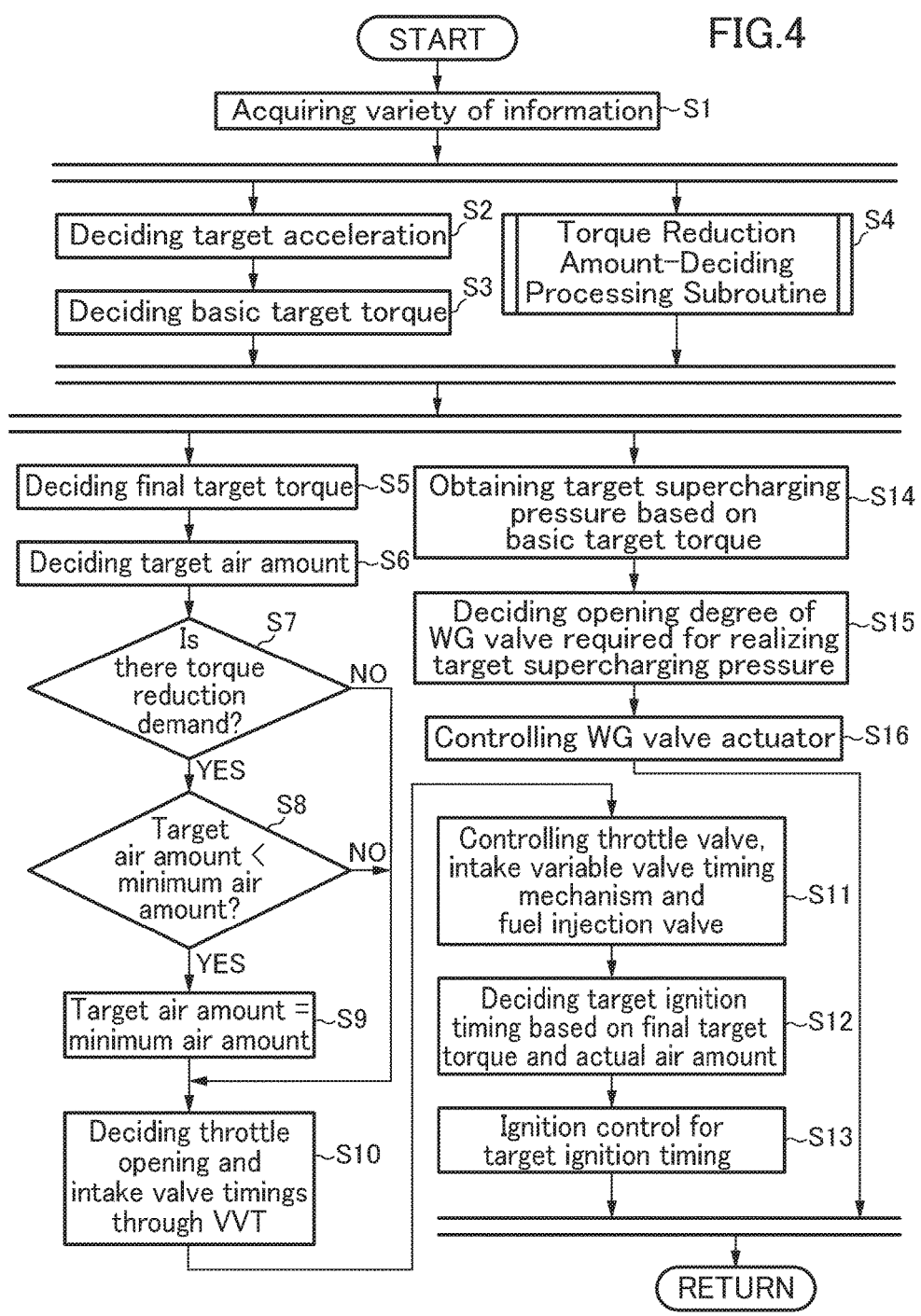
FIG. 4 is a flowchart of a first example of engine control processing routine to be executed by the turbocharged engine control device according to this embodiment, so as to control a turbocharged engine.
Figure 5:
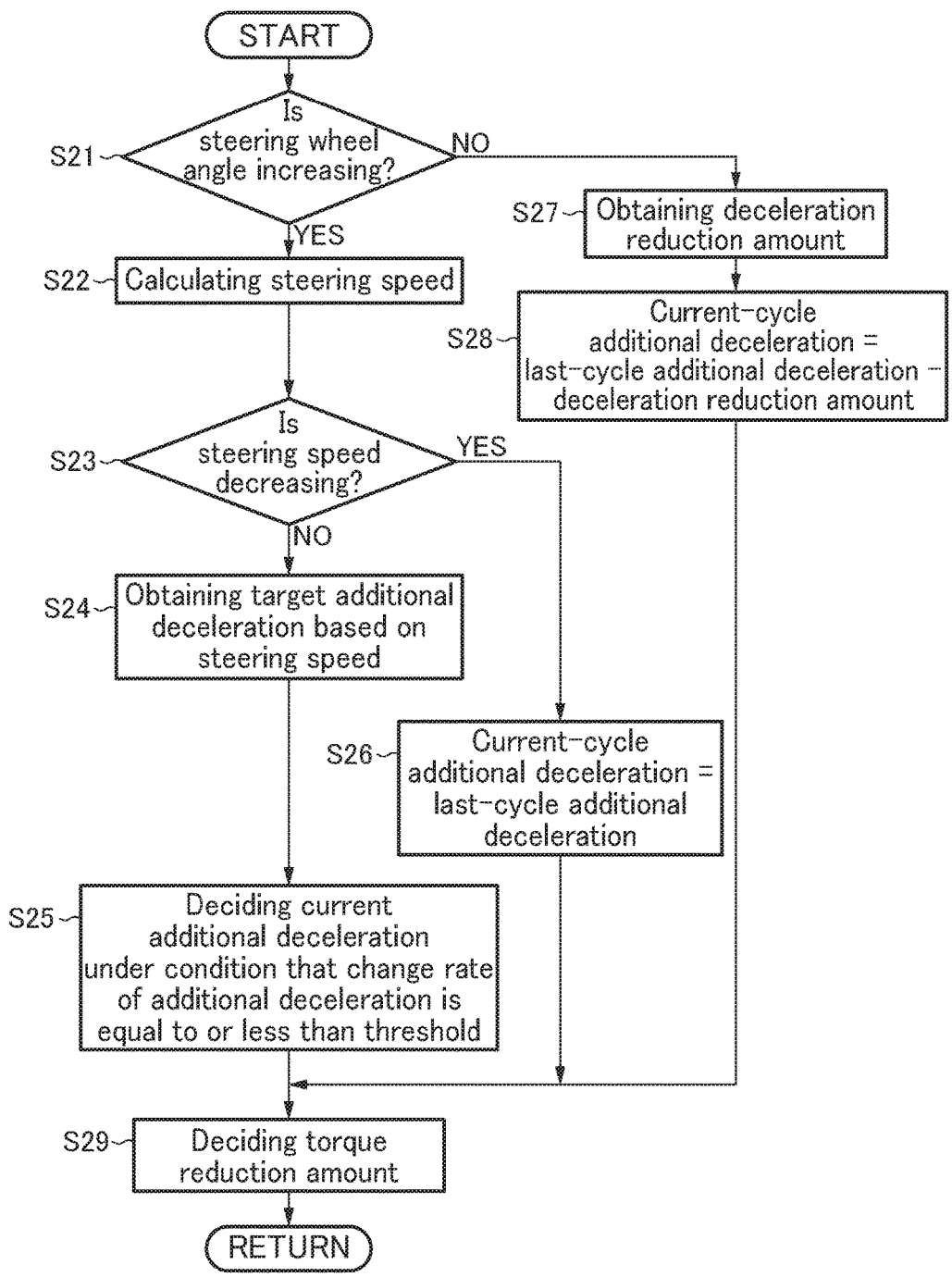
FIG. 5 is a flowchart of torque reduction amount-deciding processing subroutine to be executed by the turbocharged engine control device according to this embodiment, so as to decide a torque reduction amount.

FIG. 4 is a flowchart of the first example of the engine control processing routine to be executed by the turbocharged engine control device according to this embodiment, so as to control the engine 100, and FIG. 5 is a flowchart of a torque reduction amount-deciding processing subroutine to be executed by the turbocharged engine control device according to this embodiment, so as to decide a torque reduction amount. FIG. 6 is a map depicting a relationship between steering speed, and target additional deceleration to be decided by the turbocharged engine control device according to this embodiment.

The engine control processing routine in FIG. 4 is activated when an ignition switch of a vehicle mounting the engine 100 is turned on to apply power to the turbocharged engine control device, and repeatedly executed with a given cycle period.

As depicted in FIG. 4, upon start of the engine control processing routine, in step S1, the PCM 60 operates to acquire information about a driving state of the vehicle. Specifically, the PCM 60 operates to acquire, as information about the vehicle driving state, detection signals S140 to S154 output from the aforementioned sensors 40 to 54, including an accelerator position detected by the accelerator position sensor 40, a vehicle speed detected by the vehicle speed sensor 53, a steering wheel angle detected by the steering wheel angle sensor 54, and a gear stage currently set in a transmission of the vehicle.

Subsequently, in step S2, the basic target torque-deciding part 61 of the PCM 60 operates to set a target acceleration based on the vehicle driving state including an accelerator pedal operation state, acquired in the step S1. Specifically, the basic target torque-deciding part 61 operates to select, from among a plurality of acceleration characteristic maps each defining a relationship between acceleration and accelerator position, with respect to various vehicle speeds and various gear stages (the maps are preliminarily created and stored in a memory or the like), one acceleration characteristic map associated with a current vehicle speed and a current gear stage, and decide, as a target acceleration, an acceleration corresponding to a current accelerator position, with reference to the selected acceleration characteristic map.

Subsequently, in step S3, the basic target torque-deciding part 61 operates to decide a basic target torque of the engine 100 for realizing the target acceleration decided in the step S2. In this processing, the basic target torque-deciding part 61 operates to decide the basic target torque within a torque range outputtable by the engine 100, based on current vehicle speed, gear stage, road grade, road surface mu ($\mu$), etc.

In parallel with the processings in the steps S2 and S3, in step S4, the torque reduction amount-deciding part 63 operates to perform torque reduction amount-deciding processing subroutine for deciding a torque reduction amount based on the vehicle driving state other than the steering wheel operation state. This torque reduction amount-deciding processing subroutine will be described with reference to FIG. 5.

As depicted in FIG. 5, upon start of the torque reduction amount-deciding processing subroutine, in step S21, the torque reduction amount-deciding part 63 operates to determine whether or not an absolute value of the steering wheel angle acquired in the step S1 is increasing. As a result, when the absolute value of the steering wheel angle is increasing, the subroutine proceeds to step S22. In the step S22, the torque reduction amount-deciding part 63 operates to calculate a steering speed based on the steering wheel angle acquired in the step S1.

Subsequently, in step S23, the torque reduction amount-deciding part 63 operates to determine whether or not an absolute value of the steering speed is decreasing.

As a result, when the absolute value of the steering speed is not decreasing, i.e., the absolute value of the steering speed is increasing or the absolute value of the steering speed does not change, the subroutine proceeds to step S24. In the step S24, the torque reduction amount-deciding part 63 operates to obtain a target additional deceleration based on the calculated steering speed. This target additional deceleration is a deceleration to be added to the vehicle according to the steering wheel operation in order to accurately realize a vehicle behavior which is intended by a driver.

Figure 6:
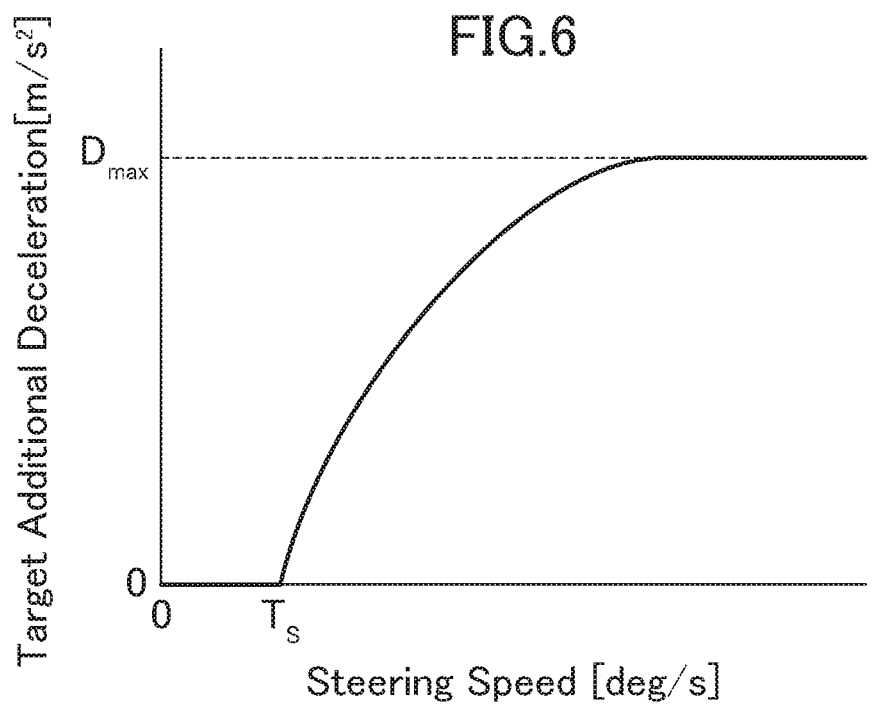
FIG. 6 is a map depicting a relationship between steering speed, and target additional deceleration to be decided by the turbocharged engine control device according to this embodiment.

Specifically, the torque reduction amount-deciding part 63 operates to obtain a value of the target additional deceleration corresponding to the steering speed calculated in the step S32, based on a relationship between target additional deceleration and steering speed, shown by the map in FIG. 6.

In FIG. 6, the horizontal axis represents steering speed, and the vertical axis represents the target additional deceleration. As depicted in FIG. 6, when steering speed is less than a threshold $T_s$, a corresponding value of the target additional deceleration is 0. That is, when steering speed is less than the threshold $T_s$, the control of adding deceleration to the vehicle according to the steering wheel operation is not performed.

On the other hand, when steering speed is equal to or greater than the threshold $T_s$, a value of the target additional deceleration corresponding to this steering speed comes closer to a given upper limit value $D_{max}$ (e.g., 1 m/s$^2$). That is, as the steering speed becomes larger, the target additional deceleration becomes larger, and a rate of increase of the target additional deceleration becomes smaller.

Subsequently, in the step S25, the torque reduction amount-deciding part 63 operates to decide an additional deceleration in the current processing cycle (current-cycle additional deceleration), under a condition that an increase rate of the additional deceleration is equal to or less than a threshold $R_{max}$ (e.g., 0.5 m/s$^3$).

Specifically, the torque reduction amount-deciding part 63 operates to, when an increase rate from an additional deceleration decided in the last processing cycle (last-cycle additional deceleration) to the target additional deceleration obtained in the step S24 in the current cycle is equal to or less than the threshold $R_{max}$, decide the target additional deceleration obtained in the step S24, as the current-cycle additional deceleration.

On the other hand, the torque reduction amount-deciding part 63 operates to, when the increase rate from the last-cycle additional deceleration to the target deceleration obtained in the step S24 in the current processing cycle is greater than the threshold $R_{max}$, decide, as the current-cycle additional deceleration, a value obtained by increasing the last-cycle additional deceleration at the increase rate $R_{max}$ for the given cycle period.

Referring to the step S23 again, when the absolute value of the steering speed is decreasing, the subroutine proceeds to step S26. In the step S26, the torque reduction amount-deciding part 63 operates to decide the last-cycle additional deceleration as the current-cycle additional deceleration. That is, when the absolute value of the steering speed is decreasing, an additional deceleration corresponding to a maximum value of the steering speed (i.e., a maximum value of the additional deceleration) is maintained.

Referring to the step S21 again, when the absolute value of the steering wheel angle is not increasing (i.e., is maintained constant or is decreasing), the subroutine proceeds to step S27. In the step S27, the torque reduction amount-deciding part 63 operates to obtain an amount (deceleration reduction amount) by which the last-cycle additional deceleration is to be reduced in the current processing cycle. For example, the deceleration reduction amount may be calculated based on a constant reduction rate (e.g., 0.3 m/s$^3$) preliminarily stored in a memory or the like. Alternatively, the deceleration reduction amount may be calculated based on a reduction rate decided according to the vehicle driving state acquired in the step S1 and/or the steering speed calculated in Step S22.

Subsequently, in step S28, the torque reduction amount-deciding part 63 operates to decide the current-cycle additional deceleration by subtracting the deceleration reduction amount obtained in the step S27 from the last-cycle additional deceleration.

After completion of the step S25, S26 or S28, in step S29, the torque reduction amount-deciding part 63 operates to decide the torque reduction amount, based on the current-cycle additional deceleration decided in the step S25, S26 or S28. Specifically, the torque reduction amount-deciding part 63 operates to decide a value of the torque reduction amount required for realizing the current-cycle additional deceleration, based on the current vehicle speed, gear stage, road gradient and others acquired in the Step S1. After completion of the step S29, the torque reduction amount-deciding part 63 operates to terminate the torque reduction amount-deciding processing subroutine, and the subroutine returns to the main routine.

Returning to FIG. 4, after completion of the processings in the steps S2 and S3 and the torque reduction amount-deciding processing subroutine in the step S4, in step S5, the final target torque-deciding part 65 operates to subtract the torque reduction amount decided by the torque reduction amount-deciding processing subroutine in the step S4, from the basic target torque decided in the step S3 to thereby decide the final target torque.

Subsequently, in step S6, the engine output control part 67 operates to decide a target equivalent ratio and a target air amount which are required for the engine 100 to output the final target torque decided in the step S5. As used herein, the term "air amount" means an amount of air to be introduced into the combustion chamber 11 of the engine body 10.

Specifically, the engine output control part 67 operates to calculate a target indicated torque based on the final target torque and by additionally taking into consideration a loss torque due to friction loss and pumping loss, and calculate a target heat generation amount required for generating the target indicated torque, and, based on the calculated target heat generation amount and a target equivalent ratio, to decide a target air amount.

Subsequently, in step S7, the engine output control part 67 operates to determine whether or not there is a demand for torque reduction based on the vehicle driving state other than the accelerator pedal operation state. Specifically, the engine output control part 67 operates to, when the torque reduction amount decided by the torque reduction amount-deciding processing subroutine in the step S4 is greater than 0, determine that there is the torque reduction demand.

As a result of the determination, when there is the torque reduction demand, the processing routine proceeds to step S8. In the step S8, the engine output control part 67 operates to determine whether or not the target air amount decided in the step S6 is less than a minimum air amount. As used herein, the term "minimum air amount" means a minimum value of the air amount for enabling the air bypass valve to be maintained in the closed state.

Specifically, the engine output control part 67 operates to refer to the compressor performance map depicted in FIG. 3, and determine, as the minimum compressor passing flow rate, a value of the compressor passing flow rate on the surge line L corresponding to a current compressor pressure ratio. Then, the engine output control part 67 operates to convert the minimum compressor passing flow rate into an air amount to be introduced into the combustion chamber 11 of the engine body 10, i.e., a minimum air amount, based on engine speed. The minimum air amount varies according to the operating state of the compressor 4a, so that it is repeatedly calculated by the engine output control part 67 during the operation of the engine 100.

When the target air amount decided in the step S6 is determined in the step S8 to be less than the minimum air amount, the processing routine proceeds to step S9. In the step S9, the engine output control part 67 operates to reset the target air amount decided in the step S6 to a value equal to the minimum air amount.

When it is determined in the step S7 that there is no torque reduction demand, or when the target air amount decided in the step S6 is determined in the step S8 to be not less than the minimum air amount (to be equal to greater than the minimum air amount), or after completion of the step S9, the processing routine proceeds to step S10. In the step S10, the engine output control part 67 operates to decide an opening degree of the throttle valve 6, and opening and closing timings of the intake valve 12 through the intake variable valve timing mechanism 18, while taking into account the intake air amount detected by the airflow sensor 41, so as to enable air to be introduced into the engine body 10 in an amount equal to the target air amount decided in the step S6 or the target air amount set in the step S9.

Subsequently, in step S11, the engine output control part 67 operates to control the throttle valve 6 and the intake variable valve timing mechanism 18, based on the throttle opening and the opening and closing timings of the intake valve 12 set in the step S10, and control the fuel injection valve 13, based on the target equivalent ratio decided in the step S6, and an actual air amount estimated based on the detection signal S141 from the airflow sensor 41, etc.

As mentioned above, when the target air amount decided in the step S6 is determined in the step S8 to be less than the minimum air amount, the target air amount decided in the step S6 is reset to a value equal to the minimum air amount, and the opening degree of the throttle valve 6 and the opening and closing timings of the intake valve 12 through the intake variable valve timing mechanism 18 are decided so as to enable air to be introduced into the engine body 10 in an amount equal to the reset target air amount. That is, when the operating state of the engine 100 is in a supercharging region where supercharging by the compressor 4a is performed, and therefore an air amount equal to or greater than the minimum air amount is required to maintain the air bypass valve 9 in the closed state, the control of the throttle valve 6 and the intake variable valve timing mechanism 18 is restricted so as to prevent an amount of air to be introduced into the engine body 10 from becoming less than the minimum air amount.

In this embodiment, "non-supercharging region" where no supercharging by the compressor 4a is performed means the case where the WG valve 31 is fully opened (opening degree of the WG valve is 100%) or a pressure at a position in the intake passage 1 between the compressor 4a of the turbocharger 4 and the throttle valve 6 is equal to or less than atmospheric pressure. Further, "supercharging region" where supercharging by the compressor 4a is performed means the case where an operating state of the engine 100 does not fall within the non-supercharging region described above.

Subsequently, in step S12, the engine output control part 67 operates to, based on the final target torque decided in the step S5, and an actual air amount actually introduced into the combustion chamber 11 by controlling the throttle valve 6 and the intake variable valve timing mechanism 18 in the step S11, set a target value of an ignition timing (hereinafter referred to as "target ignition timing") required for the engine 100 to output the final target torque.

Specifically, the engine output control part 67 operates to estimate an actual air amount, based on the detection signal (S141 of the air flow sensor 41, etc. Then, the engine output control part 67 operates to select, from among a plurality of ignition advance maps each defining a relationship between ignition timing and indicated torque, with respect to various air amounts and various engine speeds (the maps are preliminarily created and stored in a memory or the like), one ignition advance map associated with the estimated actual air amount and a current engine speed, and decide, as a target ignition timing, an ignition timing corresponding to the target indicated torque calculated in the step S16, with reference to the selected ignition advance map.

In the ignition advance map, on an assumption that the horizontal axis represents the ignition timing, and the vertical axis represents the indicated torque, the ignition advance map, the relationship between ignition timing and indicated torque is expressed as an upwardly convexed curve in which the indicated torque has a local maximum value when the ignition timing is at MBT (Minimum Advance for Best Torque) and gradually decreases as the ignition timing is advanced or retarded with respect to MBT.

For example, in the case where, due to response lag of an actual air amount with respect to a reduction in the target air amount responsive to a torque reduction demand, the actual air amount becomes excessive with respect to the reduced target air amount, an indicated torque at MBT in one ignition advance map associated with the actual air amount is greater than an indicated torque at MBT in another ignition advance map associated with the reduced target air amount. In other words, an ignition timing corresponding to the target indicated torque in one ignition advance map associated with the actual air amount is retarded with respect to an ignition timing corresponding to the target indicated torque in another ignition advance map associated with the reduced target air amount. That is, the target ignition timing is gradually shifted toward a retard side as the actual air amount becomes more excessive with respect to the reduced target air amount.

However, when the target ignition timing is on a retard side with respect to a given retard limit, the retard limit is decided as the target ignition timing. This retard limit is a threshold limit valve of a retard amount experimentally predetermined from a viewpoint of combustion stability coping with significant deterioration in combustion efficiency and misfire.

Subsequently, in step S13, the engine output control part 67 operates to control the spark plug 14 so as to perform ignition at the target ignition timing decided in the step S12.

In parallel with processing in the steps S5 to S13, in step S14, the engine output control part 67 operates to obtain a target supercharging pressure of the turbocharger 4. For example, a map representing a relationship between target torque and target supercharging pressure is preliminarily stored in a memory or the like, and the engine output control part 67 operates to refer to the map and obtain a target supercharging pressure corresponding to the basic target torque decided in the step S3.

Subsequently, in step S15, the engine output control part 67 operates to decide an opening degree of the WG valve 31 required for realizing the target supercharging pressure obtained in the step S14.

Subsequently, in step S16, the engine output control part 67 operates to control an actuator of the WG valve 31, based on the opening degree set in the step S25.

In this processing, the engine output control part 67 operates to control the actuator of the WG valve 31 according to the opening degree set in the step S15, and feedback-control the actuator so as to cause a supercharging pressure detected by the first pressure sensor 43 to come close to the target supercharging pressure obtained in the step S16. After completion of the steps S13 and S16, the PCM 60 completes one cycle of the engine control processing routine.

Figure 7:
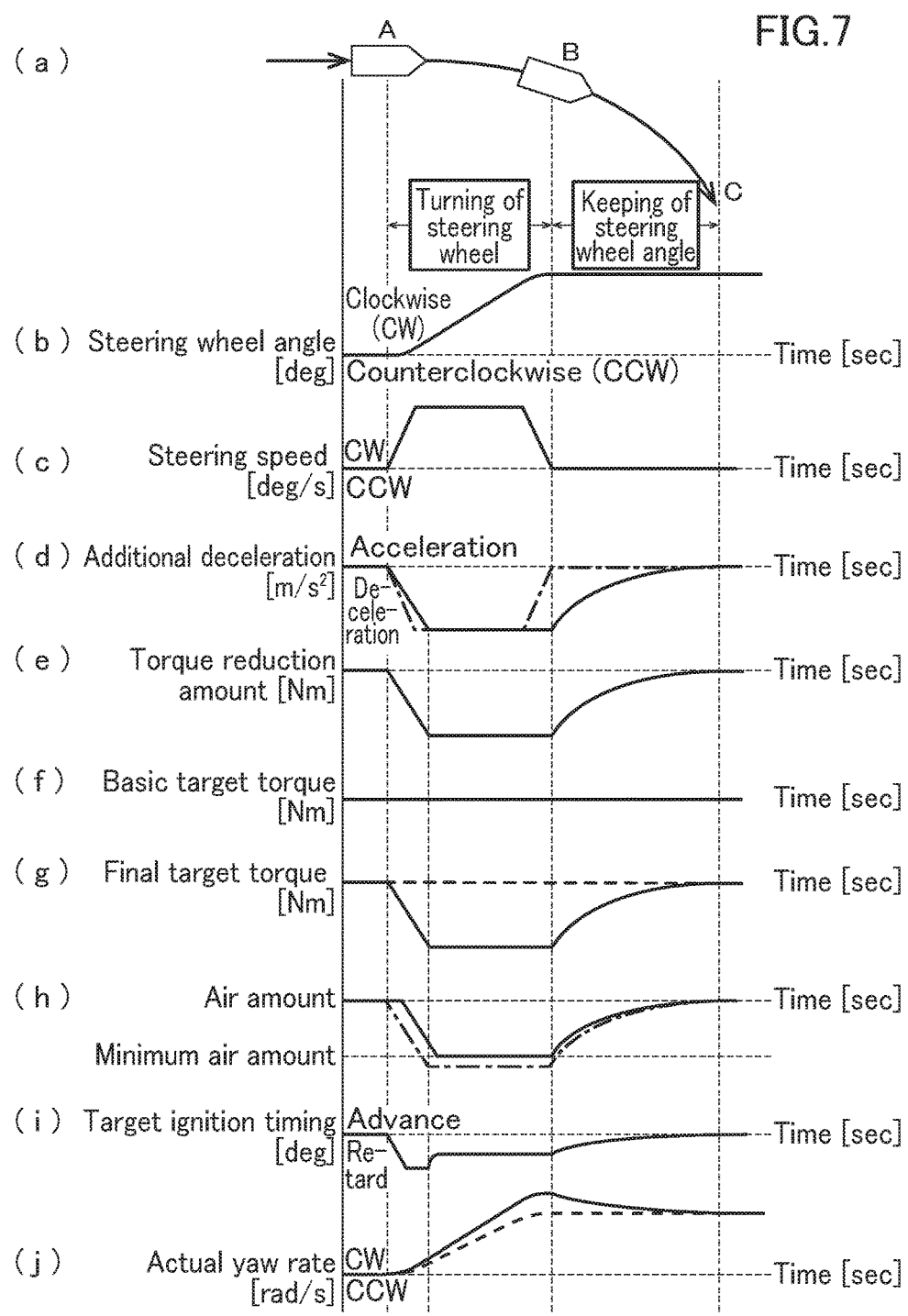
FIG. 7 is a time chart presents a temporal change in each parameter pertaining to engine control to be performed by the turbocharged engine control device according to this embodiment during turning of a vehicle equipped with the turbocharged engine control device, wherein: chart (a) is a top plan view schematically depicting the vehicle which is turning in a clockwise direction; chart (b) presents a change in steering wheel angle of the vehicle which is turning in the clockwise direction as depicted in the chart (a); chart (c) presents a change in steering speed of the vehicle which is turning in the clockwise direction as depicted in the chart (a); chart (d) presents a change in additional deceleration decided based on the steering speed presented in the chart (c); chart (e) presents a change in torque reduction amount decided based on the additional deceleration presented in the chart (d); chart (f) presents a change in basic target torque; chart (g) presents a change in final target torque decided based on the basic target torque and the torque reduction amount; chart (h) presents a changes in target air amount decided based on the final target torque and in actual air amount; chart (i) presents a target ignition timing decided based on the final target torque and the actual air amount, on the basis of a basic ignition timing; and chart (j) presents a change in yaw rate (actual yaw rate) generated in the vehicle when an intake air amount and an ignition timing are controlled as presented in the charts (h) and (i), and a change in actual yaw rate generated in the vehicle when the control based on the torque reduction amount decided by a torque reduction amount-deciding part is not performed.

Next, with reference to FIG. 7, an operation of the turbocharged engine control device according to this embodiment will be described. FIG. 7 is a time chart presenting a temporal change in each parameter pertaining to engine control to be performed by the turbocharged engine control device according to this embodiment during turning of a vehicle equipped with the turbocharged engine control device.

Chart (a) is a top plan view schematically depicting the vehicle which is turning in a clockwise direction. As depicted in chart (a), the vehicle starts to turn from a position A, and continues to turn from a position B to a position C in the clockwise direction at a constant steering wheel angle.

Chart (b) presents a change in steering wheel angle of the vehicle which is turning in the clockwise direction as depicted in the chart (a). In the chart (b), the horizontal axis represents time, and the vertical axis represents steering wheel angle.

As presented in the chart (b), clockwise steering is started at the position A, and then, along with an additional turning operation of the steering wheel, a clockwise steering wheel angle gradually increases and reaches a maximum value at the position B. Subsequently, the steering wheel angle is maintained constant until the vehicle reaches the position C (Keeping of the steering wheel angle).

Chart (c) presents a change in steering speed of the vehicle which is turning in the clockwise direction as depicted in the chart (a). In the chart (c), the horizontal axis represents time, and the vertical axis represents steering speed.

The steering speed in the vehicle is expressed as a temporal differentiation of the steering wheel angle in the vehicle. That is, as presented in the chart (c), when clockwise steering is started at the position A, a clockwise steering speed arises and is maintained approximately constant in an intermediate zone between the position A and the position B. Then, when the clockwise steering speed deceases and the clockwise steering wheel angle reaches the maximum value at the position B, the steering speed becomes 0. Then, when the clockwise steering wheel angle is maintained during traveling from the position B to the position C, the steering speed is kept at 0.

Chart (d) presents a change in additional deceleration decided based on the steering speed presented in the chart (c). In the chart (d), the horizontal axis represents time, and the vertical axis represents additional deceleration. In the chart (d), the solid line indicates a change in the additional deceleration decided in the torque reduction amount-deciding processing subroutine in FIG. 5, and the one-dot chain line indicates a change in target additional deceleration based on steering speed. As with the change in steering speed presented in the chart (c), the target additional deceleration indicated by the one-dot chain line starts to increase from the position A, and is maintained approximately constant in an intermediate zone between the position A and the position B, whereafter it decreases, and becomes 0 at the position B.

As described with reference to FIG. 5, when the absolute value of the steering speed is determined in the step S23 to be not decreasing, i.e., to be increasing or to have no change, the torque reduction amount-deciding part 63 operates in the step S24 to obtain the target additional deceleration based on the steering speed. Subsequently, in the step S25, the torque reduction amount-deciding part 63 operates to decide an additional deceleration in each processing cycle, under the condition that the increase rate of additional deceleration is equal to or less than the threshold $R_{max}$.

The chart (d) presents a case where an increase rate of the target additional deceleration starting to increase from the position A is greater than the threshold $R_{max}$. In this case, the torque reduction amount-deciding part 63 operates to increase the additional deceleration at an increase rate equal to the upper limit $R_{max}$ (i.e., at an increase rate providing a gentler slope than that of the target additional deceleration indicated by the one-dot chain line). Then, when the target additional deceleration is maintained approximately constant in the intermediate zone between the position A and the position B, the torque reduction amount-deciding part 63 operates to decide that the additional deceleration is equal to the target additional deceleration.

Then, when the absolute value of the steering speed is determined in the step S23 depicted in FIG. 5 to be decreasing, the torque reduction amount-deciding part 63 operates to maintain the additional deceleration at the maximum steering speed, as mentioned above. Specifically, in the chart (d), when the steering speed decreases toward the position B, the target additional deceleration indicated by the one-dot chain line also decreases along therewith, but the additional deceleration indicated by the solid line is maintained at its maximum value, until the vehicle 1 reaches the position B.

On the other hand, when the absolute value of the steering angle is determined, in the step S21 depicted in FIG. 5, to be maintained constant or to be decreasing, the torque reduction amount-deciding part 63 operates to obtain the deceleration reduction amount in the step S27, and reduce the additional deceleration by the obtained deceleration reduction amount, as mentioned above. In the chart (d), the torque reduction amount-deciding part 63 operates to reduce the additional deceleration to cause a reduction rate of the additional deceleration to become gradually smaller, i.e., to cause a slope of the solid line indicative of a change in additional deceleration to become gradually gentler.

Chart (e) presents a change in torque reduction amount decided based on the additional deceleration presented in the chart (d). In the chart (e), the horizontal axis represents time, and the vertical axis represents torque reduction amount.

As mentioned above, the torque reduction amount-deciding part 63 operates to decide a value of the torque reduction amount required for realizing a current-cycle additional deceleration, based on parameters such as current vehicle speed, gear stage and road gradient. Thus, in the case where respective values of these parameters are constant, the torque reduction amount is decided such that it changes in the same pattern as that of the additional deceleration presented in the chart (d).

Chart (f) presents a change in basic target torque. In the chart (f), the horizontal axis represents time, and the vertical axis represents torque.

In one example shown in the chart (f), the basic target torque decided so as to realize the target acceleration set based on accelerator position, vehicle speed, gear stage and others is a constant value.

Chart (g) presents a change in final target torque decided based on the basic target torque and the torque reduction amount. In the chart (g), the horizontal axis represents time, and the vertical axis represents torque. In the chart (g), the dotted line indicates the basic target torque, and the solid line indicates the final target torque.

As described with reference to FIG. 5, the final target torque-deciding part 65 operates to subtract the torque reduction amount decided by the torque reduction amount-deciding processing subroutine in the step S4, from the basic target torque decided in the step S3, to thereby decide the final target torque. Thus, as indicated by the solid line in the chart (g), the change in torque reduction amount is reflected on the final target torque.

Chart (h) presents changes in target air amount decided based on the final target torque and in actual air amount. In the chart (h), the horizontal axis represents time, and the vertical axis represents air amount. In the chart (h), the one-dot chain line indicates a target air amount corresponding to the final target torque presented in the chart (g), and the solid line indicates an actual air amount actually introduced into the combustion chamber 11 by controlling the throttle valve 6 and the intake variable valve timing mechanism 18 according to the final target torque.

As presented in the chart (h), although the target air amount changes in synchronization with a temporal change in the final target torque, there occurs response lag of the actual air amount with respect to the change in the final target torque. That is, when the target air amount is reduced, the actual air amount becomes excessive.

Moreover, as mentioned above, when the target air amount decided in the step S6 is determined in the step (S8 depicted in FIG. 4 to be less than the minimum air amount, the target air amount decided in the step S6 is reset to a value equal to the minimum air amount, and the opening degree of the throttle valve 6 and the opening and closing timings of the intake valve 12 through the intake variable valve timing mechanism 18 are decided so as to enable air to be introduced into the combustion chamber 11 in an amount equal to the reset target air amount. That is, in the case where the opening state of the engine 100 falls within the supercharging region where supercharging by the compressor 4a is performed, and therefore an air amount equal to or greater than the minimum air amount is required to maintain the air bypass valve 9 in the closed state, the control of the throttle valve 6 and the intake variable valve timing mechanism 18 is restricted so as to prevent an amount of air to be introduced into the combustion chamber from becoming less than the minimum air amount.

Chart (i) presents a target ignition timing decided based on the final target torque and the actual air amount, on the basis of an ignition timing required for the engine 100 to output the final target torque when air is introduced into the combustion chamber 11 in an amount equal to the minimum air amount (hereinafter referred to as "basic ignition timing"). In the chart (i), the horizontal axis represents time, and the vertical axis represents basic ignition timing.

As presented in the chart (h), when the target air amount is reduced according to a reduction in the final target torque, due to the occurrence of response lag of an actual air amount, the actual air amount becomes excessive with respect to the reduced target air amount. Thus, a desired reduction in the final target torque cannot be realized only by means of a reduction in the actual air amount. Therefore, based on the final target torque and the actual air amount, the target ignition timing is set to a retard side with respect to the basic ignition timing to thereby realize the desired reduction in the final target torque.

In addition, when the control of the throttle valve 6 and the intake variable valve timing mechanism 18 is restricted so as to prevent an amount of air to be introduced into the combustion chamber from becoming less than the minimum air amount, as presented by the chart (h), a reduction in air amount is not sufficient for a reduction in the final target torque corresponding to an increase in the torque reduction amount. Thus, an ignition timing required for the engine 100 to output the final target torque is set as the target ignition timing, and the basic ignition timing is retarded in accordance with the target ignition timing to thereby realize the desired reduction in the final target torque.

Chart (j) presents a change in yaw rare (actual yaw rate) generated when control of the engine 100 is performed so as to realize the final target torque as presented in the chart (g), and a change in actual yaw rate generated when control corresponding to the torque reduction amount presented in the chart (e) is not performed (i.e., control of the engine 100 is performed so as to realize the basic target torque as presented in the chart (f), under the condition the steering wheel in the vehicle is operated as presented in the chart (b). In the chart (j), the horizontal axis represents time and the vertical axis represents yaw rate. In the chart (j), the solid line indicates a change in actual yaw rate when the control of the engine 100 is performed to realize the final target torque, and the dotted line indicates a change in actual yaw rate generated when the control corresponding to the torque reduction amount is not performed.

After clockwise steering is started at the position A, when the torque reduction amount is increased as presented in the chart (e) along with an increase in clockwise steering speed, a load applied to the front road wheels as steerable road wheels of the vehicle is increased. As a result, a frictional force between each of the front road wheels and a road surface is increased, and a cornering force of the front road wheels is increased, thereby providing an improved turn-in ability of the vehicle. That is, as depicted in the chart (j), when the control of the engine 100 is performed in the intermediate zone between the position A and the position B so as to realize the final target torque reflecting the torque reduction amount (solid line), a larger clockwise (CW) yaw rate is generated in the vehicle, as compared to the case where the control corresponding to the torque reduction amount is not performed (dotted line).

In addition, as presented in the charts (d) and (e), when the steering speed is gradually reduced toward the position B, the torque reduction amount is maintained at its maximum value, although the target additional deceleration is reduced. Thus, it becomes possible to maintain the load applied to the front road wheels and keep up the turn-in ability of the vehicle, as long as the tuning of the steering wheel is continued.

Further, when the absolute value of the steering wheel angle is maintained constant during traveling from the position B to the position C, the torque reduction amount is smoothly reduced. Thus, in response to completion of the turning of the steering wheel, the load applied to the front road wheels can be gradually reduced to gradually reduce the cornering force of the front road wheels, thereby restoring the output torque of the engine 100, while stabilizing a vehicle body.

Figure 8:
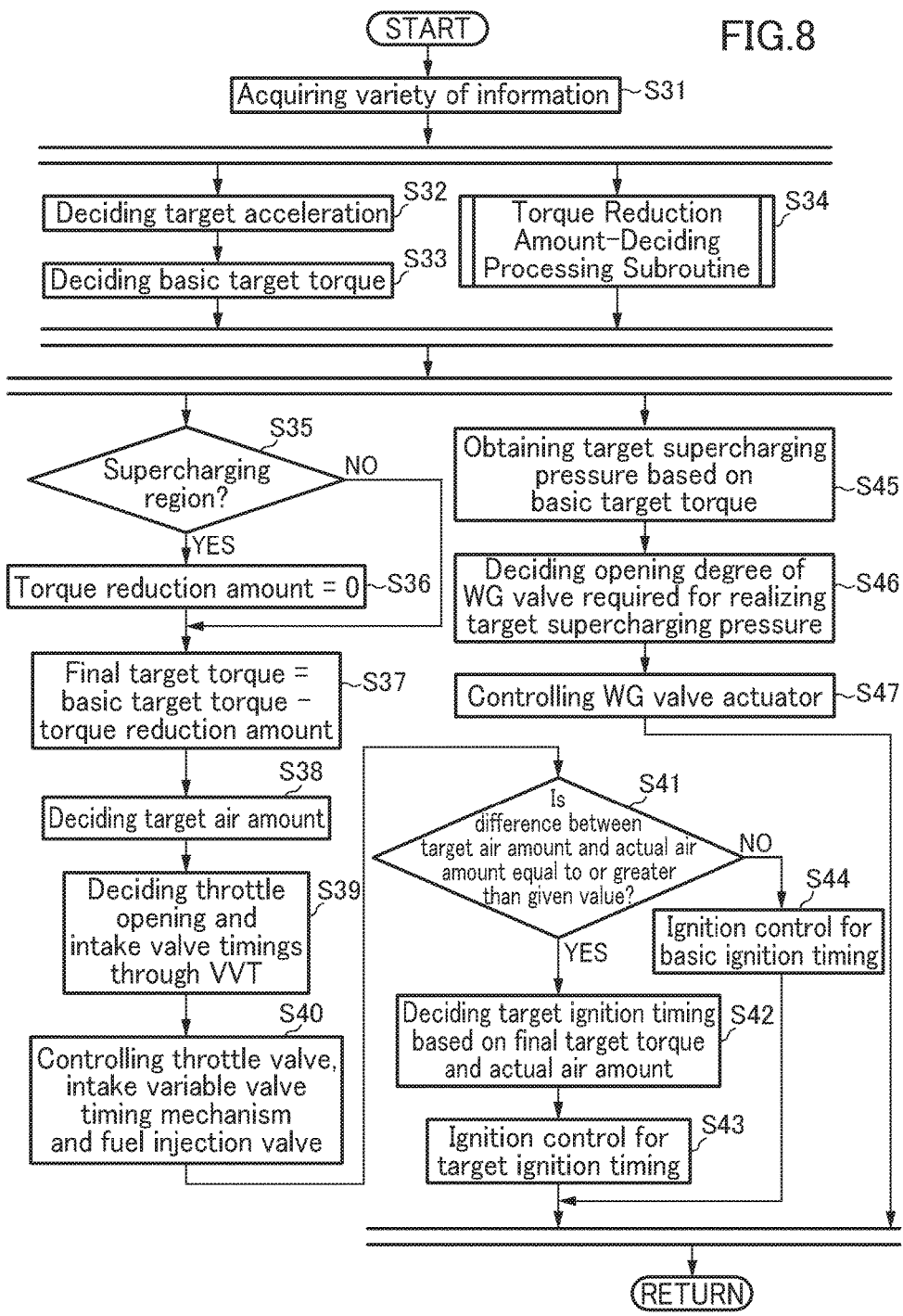
FIG. 8 is a flowchart of a second example of the engine control processing routine to be executed by the turbocharged engine control device according to this embodiment, so as to control the turbocharged engine.

Next, with reference to FIG. 8, a second example of the engine control processing routine to be executed by the turbocharged engine control device according to this embodiment will be described. FIG. 8 is a flowchart of the second example of the engine control processing routine to be executed by the turbocharged engine control device according to this embodiment, so as to control the engine.

Processings in steps S31 to S35 and S45 to S47 in the second example of the engine control processing routine depicted in FIG. 8 are the same as those in the steps S1 to S5 and S14 to S16 in the first example described with reference to FIG. 4, and therefore their description will be omitted.

In the second example of the engine control processing routine depicted in FIG. 8, when the operating state of the engine 100 falls within the supercharging range where supercharging by the compressor 4a is performed, a change in the intake air amount according to a change in the final target torque corresponding to a change in the torque reduction amount is prohibited.

Specifically, after completion of the processings in the steps S32 and S33 and the torque reduction amount-deciding processing subroutine in the step S34, in step S35, the final target torque-deciding part 65 operates to determine whether or not the operating state of the engine 100 falls within the supercharging region where supercharging by the compressor 4a is performed.

Specifically, the final target torque-deciding part 65 operates to refer to a supercharging map in which an operating state of the engine 100 defined by engine load and engine speed is divided into a supercharging region where supercharging by the compressor 4a is performed and a non-supercharging region where no supercharging by the compressor 4a is performed (the map is preliminarily created and stored in a memory or the like), and determine within which of the supercharging region and the non-supercharging region an operating state of the engine 100 corresponding to the basic target torque determined in the step S33 and a current engine speed falls within.

As a result of the determination, when the operating state of the engine 100 falls within the supercharging region, the processing routine proceeds to step S36. In the step S36, the final target torque-deciding part 65 operates to reset the torque reduction amount decided in the step S34 to 0. That is, suppose that there is no torque reduction demand.

After completion of the step S36, or when the operating state of the engine 100 is determined in the step S35 to fall outside the supercharging region (fall within the non-supercharging region, the processing routine proceeds to step S37. In the step S37, the final target torque-deciding part 65 operates to decide a final target torque by subtracting the torque reduction amount decided in the step S34 or S36 from the basic target torque decided in the step S33.

Subsequently, in step S38, the engine output control part 67 operates to decide a target equivalent ratio and a target air amount which are required for the engine 100 to output the final target torque decided in the step S37.

As mentioned above, when the operating state of the engine 100 is determined in the step S35 to fall within the supercharging region, the torque reduction amount-deciding part 63 operates to reset the torque reduction amount decided in the step S34 to 0. Thus, the final target torque becomes equal to the basic target torque. In this case, the engine output control part 67 operates to decide a target equivalent ratio and a target air amount which are required for the engine 100 to output the basic target torque. In other words, when the operating state of the engine 100 is determined in the step S35 to fall within the supercharging region, the engine output control part 67 operates to prohibit the control of the engine 100 according to a change in the final target torque corresponding to a change in the torque reduction amount, and control the engine 100 according to a change in the final target torque corresponding to a change in the basic target torque.

Subsequently, in step S39, the engine output control part 67 operates to decide an opening degree of the throttle valve 6, and opening and closing timings of the intake valve 12 through the intake variable valve timing mechanism 18, while taking into account the intake air amount detected by the airflow sensor 41, so as to enable air to be introduced into the engine body 10 in an amount equal to the target air amount decided in the step S38.

Subsequently, in step S40, the engine output control part 67 operates to control the throttle valve 6 and the intake variable valve timing mechanism 18, based on the throttle opening and the opening and closing timings of the intake valve 12 set in the step S39, and control the fuel injection valve 13, based on the target equivalent ratio decided in the step S38, and an actual air amount estimated based on the detection signal S141 from the airflow sensor 41, etc.

Subsequently, in step S41, the engine output control part 67 operates to determine whether or not a difference between the target air amount decided in the step S38 and the actual air amount estimated based on the detection signal S141 from the airflow sensor 41 is equal to or greater than a given value.

As a result of the determination, when the difference between the target air amount and the actual air amount is equal to or greater than the given value, the processing routine proceeds to step S42. In the step S42, the engine output control part 67 operates to set a target ignition timing, based on the final target torque decided in the step S35, and an actual amount of air actually introduced into the combustion chamber 11 by controlling the throttle valve 6 and the intake variable valve timing mechanism 18 in the step S40.

Subsequently, in step S43, the engine output control part 67 operates to control the spark plug 14 so as to perform ignition at the target ignition timing decided in the step S42.

On the other hand, when the difference between the target air amount and the actual air amount is determined in the step S41 to be not equal to or greater than the given value (to be less than the given value), the processing routine proceeds to step S44. In the step S44, the engine output control part 67 operates to control the spark plug 14 so as to perform ignition at a basic ignition timing required for the engine 100 to output the final target torque when air is introduced into the combustion chamber in an amount equal to the target air amount. In this case, the basic ignition timing is set at a timing possibly close to MBT without causing the occurrence of knocking, in an ignition advance map associated with target air amount and engine speed.

Figure 9:
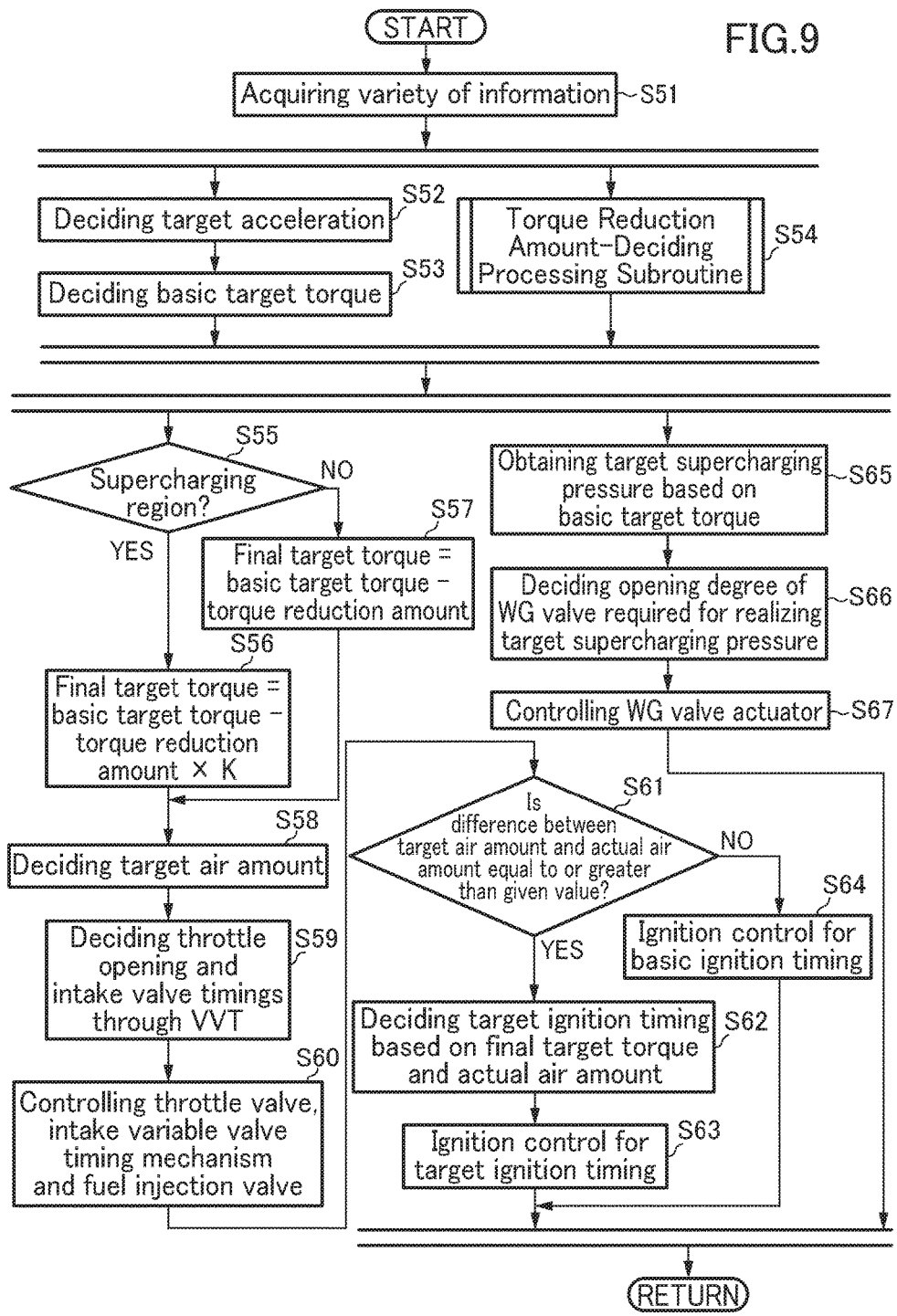
FIG. 9 is a flowchart of a third example of the engine control processing routine to be executed by the turbocharged engine control device according to this embodiment, so as to control the turbocharged engine.

Next, with reference to FIG. 9, a third example of the engine control processing routine to be executed by the turbocharged engine control device according to this embodiment will be described. FIG. 9 is a flowchart of the third example of the engine control processing routine to be executed by the turbocharged engine control device according to this embodiment, so as to control the engine.

Processings in steps S51 to S55 and S59 to S67 in the second example of the engine control processing routine depicted in FIG. 9 are the same as those in the steps S31 to S34 and S39 to S47 in the second example described with reference to FIG. 8, and therefore their description will be omitted.

In the third example of the engine control processing routine depicted in FIG. 9, when the operating state of the engine 100 falls within the supercharging range where supercharging by the compressor 4a is performed, a change in the intake air amount according to a change in the final target torque corresponding to a change in the torque reduction amount is restricted.

Specifically, after completion of the processings in the steps S52 and S53 and the torque reduction amount-deciding processing subroutine in the step S54, in step S55, the final target torque-deciding part 65 operates to determine whether or not the operating state of the engine 100 falls within the supercharging region where supercharging by the compressor 4a is performed.

As a result of the determination, when the operating state of the engine 100 falls within the supercharging region, the processing routine proceeds to step S56. In the step S56, the final target torque-deciding part 65 operates to decide a final target torque by multiplying the torque reduction amount decided through the torque reduction amount-deciding processing subroutine in the step S54 by a coefficient K of less than 1, and subtracting the resulting value from the basic target torque decided in the step S53.

On the other hand, when the operating state of the engine 100 falls outside the supercharging region (fall within the non-supercharging region), the processing routine proceeds to step S57. In the step S57, the final target torque-deciding part 65 operates to decide a final target torque by subtracting the torque reduction amount decided through the torque reduction amount-deciding processing subroutine in the step S54, from the basic target torque decided in the step S53.

After completion of the step S56 or S57, the processing routine proceeds to step S58. In step S58, the engine output control part 67 operates to decide a target equivalent ratio and a target air amount which are required for the engine 100 to output the final target torque decided in the step S56 or S57.

As above, when the operating state of the engine 100 is determined in the step S55 to fall within the supercharging region, the final target torque-deciding part 65 operates to decide a final target torque by subtracting, from the basic target torque, a value obtained by multiplying the torque reduction amount by a coefficient K of less than 1. In other words, when the operating state of the engine 100 is determined in the step S55 to fall within the supercharging region, the engine output control part 67 operates to restrict the control of the engine 100 according to a change in the final target torque corresponding to a change in the torque reduction amount.

Next, some modifications of the above embodiment will be described.

Although the above embodiment has been described based on an example in which the torque reduction amount-deciding part 63 is configured to obtain the target additional deceleration based on a steering speed, and decide the torque reduction amount based on the obtained target additional deceleration, the torque reduction amount-deciding part 63 may be configured to decide the torque reduction amount based on any driving state of the vehicle other than the accelerator pedal operation state (e.g., steering wheel angle, yaw rate, or slip ratio).

For example, the torque reduction amount-deciding part 63 may be configured to calculate a target yaw acceleration to be generated in the vehicle, based on a target yaw rate calculated from a steering wheel angle and a vehicle speed, and a yaw rate input from a yaw rate sensor, and obtain the target additional deceleration based on the calculated target yaw acceleration to decide the torque reduction amount. Alternatively, a lateral acceleration generated along with turning of the vehicle may be detected by an acceleration sensor, and the torque reduction amount may be decided based on the detected lateral acceleration. Alternatively, the torque reduction amount-deciding part 63 may be configured to determine the torque reduction amount, based on any demand different from the target additional deceleration (e.g., a torque required for cancelling out vibration of a powertrain during acceleration/deceleration).

Next, advantageous effects of the turbocharged engine control device according to the above embodiment and the modifications thereof will be described.

First of all, when the operating state of the engine 100 falls within the supercharging region where supercharging by the compressor 4a is performed, the engine output control part 67 operates to restrict the control of the engine 100 corresponding to a change in a torque reduction amount which is decided based on a driving state of the vehicle other than the accelerator pedal operation state, so that it is possible to suppress the occurrence of a situation where a supercharging pressure is excessively lowered as a result of controlling the engine 100 according to a change in the torque reduction amount without any restriction. This makes it possible to control the engine so as to accurately realize a vehicle behavior as intended by a driver, while suppressing deterioration in acceleration response.

In particular, when the operating state of the engine 100 falls within the supercharging region, the engine output control part 67 operates to prohibit the control of the engine 100 corresponding to a change in the torque reduction amount, so that it is possible to reliably prevent the occurrence of a situation where the supercharging pressure is excessively lowered as a result of controlling the engine 100 according to a change in the torque reduction amount without any restriction. This makes it possible to control the engine so as to accurately realize a vehicle behavior as intended by a driver, while reliably suppressing deterioration in acceleration response.

Further, when the operating state of the engine 100 falls within the supercharging region, the engine output control part 67 operates to restrict control of the intake air amount according to a change in the final target torque corresponding to a change in the torque reduction amount, so that it is possible to reliably prevent the occurrence of surging which would otherwise be caused by a situation where the flow rate of air passing through the compressor is excessively reduced as a result of reducing the intake air amount according to a change in the torque reduction amount without any restriction. This makes it possible to suppress a lowering of the supercharging pressure which would otherwise be caused by opening the air bypass valve 9 so as to avoid surging, and thereby suppressing deterioration in acceleration response.

In particular, when the operating state of the engine 100 falls within the supercharging region, the engine output control part 67 operates to restrict the control of the intake air amount according to a change in the final target torque corresponding to a change in the torque reduction amount, so as to enable a flow rate of intake air passing through the compressor 4a to become equal to or greater than a given flow rate, so that it is possible to reliably prevent the occurrence of surging which would otherwise be caused by a situation where the flow rate of air passing through the compressor 4a is excessively reduced as a result of reducing the intake air amount according to a change in the final target torque corresponding to a change in the torque reduction amount without any restriction. This makes it possible to reliably prevent a lowering of the supercharging pressure which would otherwise be caused by opening the air bypass valve 9 so as to avoid surging, and thereby preventing deterioration in acceleration response.

Further, the torque reduction amount-deciding part 63 is operable to decide the torque reduction amount according to operation of a steering wheel of the vehicle. Thus, a temporal change in an torque reduction amount decided based on the steering wheel operation can be reflected on a temporal change in the final target torque, so that it possible to quickly add deceleration according to the steering wheel operation by a driver to a vehicle to thereby apply load to front road wheels to quickly increase a cornering force. This makes it possible to control the engine 100 so as to accurately realize a vehicle behavior as intended by the driver, while improving responsivity with respect to the steering wheel operation.

What is claimed is:
1. A turbocharged engine control device for controlling an engine equipped with a turbocharger having a compressor provided in an intake passage, based on a driving state of a vehicle mounting the engine, comprising:
- a basic target torque-deciding part for deciding a basic target torque based on a driving state of the vehicle including an accelerator pedal operation state;
- a torque reduction amount-deciding part for deciding a torque reduction amount based on a driving state of the vehicle other than the accelerator pedal operation state;
- a final target torque-deciding part for deciding a final target torque based on the decided basic target torque and the decided torque reduction amount; and
- an engine output control part for controlling the engine to cause the engine to output the final target torque,
- wherein the engine output control part is operable, when an operating state of the engine falls within a supercharging region where supercharging by the compressor is performed, to restrict control of the engine corresponding to a change in the torque reduction amount.

2. The turbocharged engine control device as recited in claim 1, wherein the engine output control part is operable, when the operating state of the engine falls within the supercharging region where supercharging by the compressor is performed, to prohibit the control of the engine corresponding to a change in the torque reduction amount.

3. The turbocharged engine control device as recited in claim 1, wherein the torque reduction amount-deciding part is operable to decide the torque reduction amount according to operation of a steering wheel of the vehicle.

4. The turbocharged engine control device as recited in claim 3, wherein the vehicle is provided with a steering wheel angle sensor for detecting a steering wheel angle of the steering wheel, and wherein the torque reduction amount-deciding part is operable to decide a target additional deceleration to be added to the vehicle according to a steering speed calculated from the steering wheel angle, and decide a value of the torque reduction amount for realizing the target additional deceleration, the torque reduction amount-deciding part being operable to decide the target additional deceleration such that as the steering speed becomes larger, the target additional deceleration becomes larger, and a rate of increase of the target additional deceleration becomes smaller.

5. The turbocharged engine control device as recited in claim 1, wherein the engine output control part comprises an air amount control part for controlling an intake air amount to cause the engine to output the final target torque, wherein the air amount control part is operable, when the operating state of the engine falls within the supercharging region where supercharging by the compressor is performed, to restrict control of the intake air amount according to a change in the final target torque corresponding to a change in the torque reduction amount.

6. The turbocharged engine control device as recited in claim 5, wherein the air amount control part is operable, when the operating state of the engine falls within the supercharging region where supercharging by the compressor is performed, to restrict the control of the intake air amount according to a change in the final target torque corresponding to a change in the torque reduction amount, so as to enable a flow rate of intake air passing through the compressor to become equal to or greater than a given flow rate.

7. The turbocharged engine control device as recited in claim 5, wherein the engine comprises an air bypass passage having one end connected to a region of the intake passage downstream of the compressor and the other end connected to a region of the intake passage upstream of the compressor, and an air bypass valve provided in the air bypass passage,
and wherein the engine output control part is operable, when a flow rate of intake air passing through the compressor is less than a predetermined threshold, to set the air bypass valve to its open position, and wherein the engine output control part is operable to restrict the control of the intake air amount corresponding to a change in the torque reduction amount, so as to enable the flow rate of intake air passing through the compressor to become equal to or greater than the threshold.

8. A turbocharged engine control device for controlling an engine based on a driving state of a vehicle mounting the engine, the engine being equipped with a turbocharger having a compressor provided in an intake passage, a throttle valve and a spark plug, the turbocharged engine control device comprising:
- an accelerator position sensor for detecting a position of an accelerator pedal of the vehicle;
- a steering wheel angle sensor for detecting a turning angle of a steering wheel of the vehicle;
- a basic target torque-deciding part for deciding a basic target torque based on an output value of the accelerator position sensor;
- a torque reduction amount-deciding part for deciding a torque reduction amount based on an output value of the steering wheel angle sensor;
- a final target torque-deciding part for deciding a final target torque based on the decided basic target torque and the decided torque reduction amount; and
- an engine output control part for controlling an opening degree of the throttle valve and an ignition timing of the spark plug to cause the engine to output the final target torque,
- wherein the engine output control part is operable, when an operating state of the engine falls within a supercharging region where supercharging by the compressor is performed, to restrict control of the engine corresponding to a change in the torque reduction amount.

9. A turbocharged engine control device for controlling an engine equipped with a turbocharger having a compressor provided in an intake passage, based on a driving state of a vehicle mounting the engine, comprising:
- a steering wheel angle sensor for detecting a turning angle of a steering wheel of the vehicle;
- a basic target torque-deciding part for deciding a basic target torque based on a driving state of the vehicle including an accelerator pedal operation state;
- a torque reduction amount-deciding part for deciding a target additional deceleration to be added to the vehicle according to a steering speed calculated from an output value of the steering wheel angle sensor, and decide a torque reduction amount required for realizing the target additional deceleration;
- a final target torque-deciding part for deciding a final target torque based on the decided basic target torque and the decided torque reduction amount; and
- an engine output control part for controlling the engine to cause the engine to output the final target torque,
- wherein
- the engine output control part is operable, when an operating state of the engine falls within a supercharging region where supercharging by the compressor is performed, to restrict control of the engine corresponding to a change in the torque reduction amount, and the torque reduction amount-deciding part is operable to decide the target additional deceleration such that as the steering speed becomes larger, the target additional deceleration becomes larger, and a rate of increase of the target additional deceleration becomes smaller.

* * * * *